United States Patent [19]

Clarke

[11] 4,341,070
[45] Jul. 27, 1982

[54] HIGH THERMAL EFFICIENCY POWER PLANT AND OPERATING METHOD THEREFOR

[75] Inventor: John M. Clarke, Dunlap, Ill.

[73] Assignee: Caterpillar Tractor Co., Peoria, Ill.

[21] Appl. No.: 213,245

[22] PCT Filed: Mar. 31, 1980

[86] PCT No.: PCT/US80/00348
§ 371 Date: Mar. 31, 1980
§ 102(e) Date: Mar. 31, 1980

[87] PCT Pub. No.: WO81/02912
PCT Pub. Date: Oct. 15, 1981

[51] Int. Cl.³ .............................................. F02C 6/00
[52] U.S. Cl. .......................... 60/39.04; 60/39.51 R; 60/599; 60/598
[58] Field of Search .................. 60/39.02, 39.04, 599, 60/624, 728, 39.51 R; 123/68; 415/179

[56] References Cited

U.S. PATENT DOCUMENTS

| | | | |
|---|---|---|---|
| 2,594,845 | 4/1952 | Baumann | 123/68 |
| 2,633,698 | 4/1953 | Nettel | 60/599 |
| 3,977,195 | 8/1976 | Trevil | 60/599 |
| 4,122,679 | 10/1978 | Charron | 60/599 |

FOREIGN PATENT DOCUMENTS 2324088  5/1978  Fed. Rep. of Germany.

*Primary Examiner*—L. J. Casaregola
*Attorney, Agent, or Firm*—Wegner, Stellman, McCord, Wood & Dalton

[57] ABSTRACT

A method of performing work and an apparatus for performing the method utilizing the following thermodynamic cycle. Ambient air is isothermally compressed to a predetermined degree (A-B) and then heat is added to the air at constant pressure (B-C). This is followed by isentropic compression (C-D) which in turn is followed by heat addition at constant volume (D-E). Thereafter follows isentropic expansion (E-F-H-G) then finally heat recovery (G-A). The recovered heat (G-A) is preferably utilized for the initial heat addition (B-C).

4 Claims, 2 Drawing Figures

HIGH THERMAL EFFICIENCY POWER PLANT AND OPERATING METHOD THEREFOR

TECHNICAL FIELD

This invention relates to a power plant such as an engine, having a high thermal efficiency and to a method of obtaining work from an expanding fluid with high thermal efficiency.

BACKGROUND ART

A large variety of power plants generate power by the expansion of a hot, pressurized working fluid or gas which is harnessed mechanically to provide mechanical motion to convey the power to a load to perform useful work. Dependent upon the type, such power plants utilize mechanisms which operate by and large on well known cycles such as the Otto cycle, Diesel cycle and many other lesser known cycles, and involve compression of the working fluid and the addition of heat thereto prior to the expansion of the working fluid. In the usual case, the addition of heat is accomplished by the burning of fuel which, in the case of Otto and Diesel cycle mechanisms is accomplished within a working chamber within a positive displacement mechanism or, in the case of, for example, the Stirling cycle, externally but in close adjacency to a working chamber of a positive displacement mechanism.

Even before humanity's attention was focused on the very real need for the conservation of energy that has become apparent in recent years, there evolved many proposals for increasing the efficiency of such mechanisms in any of a variety of ways. For example, in conventional single stage Otto cycle mechanisms, the working fluid or gas is never fully expanded to a point whereat its pressure would equal the ambient pressure. Rather, the partially expanded working fluid would be literally dumped to atmosphere by the opening of a valve or a port at which time it would fully expand but perform no useful work in the process. Consequently, turbochargers and compound engines evolved wherein the partially expanded gas was not dumped directly to atmosphere, but rather, to an additional expander mechanism which would utilize at least some of the energy remaining in the partially expanded gas before allowing it to escape to atmosphere. In the case of turbochargers, the gas is utilized to drive a compressor to pre-compress the working fluid before entering the positive displacement mechanism on the succeeding cycle. In the case of compound engines, the gas is directed to a turbine for further expansion, which turbine frequently would be mechanically linked to the output shaft of the positive displacement mechanism.

Such proposals did in fact result in the recovery of more energy from the fuel and provide for greater efficiency of operation. However, it soon became apparent that additional losses were present in the form of so-called "blow down" losses which are due to pressure loss that occurs, without the performance of useful work, when the partially expanded gas is released in the working chamber of a positive displacement mechanism at a pressure greater than the inlet pressure of the second stage expander as the turbocharger or turbine. Consequently, there have evolved proposals for minimizing or avoiding blow down losses as, for example, that illustrated in U.S. Pat. No. 3,961,484 issued June 8, 1976 to Harp. Again, improved efficiency will result but even assuming that blow down losses are eliminated entirely in such proposals, energy is still lost in that while the working fluid is expanded all the way down to atmospheric pressure and performing work all the while, its temperature at atmospheric pressure will remain elevated above ambient temperature. The energy content of the fully expanded working fluid in the form of the heat retained thereby is, of course, lost. The present invention is directed to overcoming one or more of the above problems.

DISCLOSURE OF THE INVENTION

According to one aspect of the invention, there is provided a method of performing work utilizing the energy of an expanding working fluid including the steps of substantially isothermally compressing a working fluid from an initial pressure to a predetermined degree and thereafter adding heat to the working fluid under substantially constant pressure conditions. Subsequently, the working fluid is substantially isentropically compressed a further degree and additional heat is added to the working fluid under substantially constant volume conditions. At this point, the working fluid is substantially isentropically expanded to about the initial pressure while work is extracted therefrom. Thereafter, remaining heat is extracted from the working fluid.

According to a highly preferred embodiment of the method, the heat extracted from the working fluid after its isentropic expansion is that utilized in the initial heat addition step and the steps are performed cyclically.

According to another aspect of the invention there is provided a highly efficient apparatus for performing work which includes means for substantially isothermally compressing the working fluid which has a fluid inlet and a fluid outlet and a mechanical motion input. A heat exchanger has a first fluid flow path including a first inlet connected to the fluid outlet of the compressor as well as a first outlet. The heat exchanger also includes a second fluid flow path including a second inlet and outlet and both of the flow paths are in heat exchange relation to each other. The apparatus further includes a positive displacement mechanism having a mechanical motion output which receives working fluid from the first output of the heat exchanger for further compressing the working fluid, adding heat to the working fluid, and converting energy in the expanding working fluid into mechanical motion. An expander of the type having mechanical motion output is connected to the positive displacement mechanism for receiving expanding working fluid therefrom to further expand the same to substantially the initial pressure and for converting the energy in the expanding working fluid into mechanical motion. Means connect at least one of the mechanical motion outputs to the mechanical motion input to provide power to the compressor and means are connected to the second inlet and receive the working fluid from the expander at substantially the initial pressure for delivering the same to the second flow path of the heat exchanger so that heat energy remaining in the working fluid can be extracted and applied to the compressed working fluid in the first flow path.

Other objects and advantages will become apparent from the following specification taken in connection with the accompanying drawings.

BEST MODE FOR CARRYING OUT THE INVENTION

Figure 1:
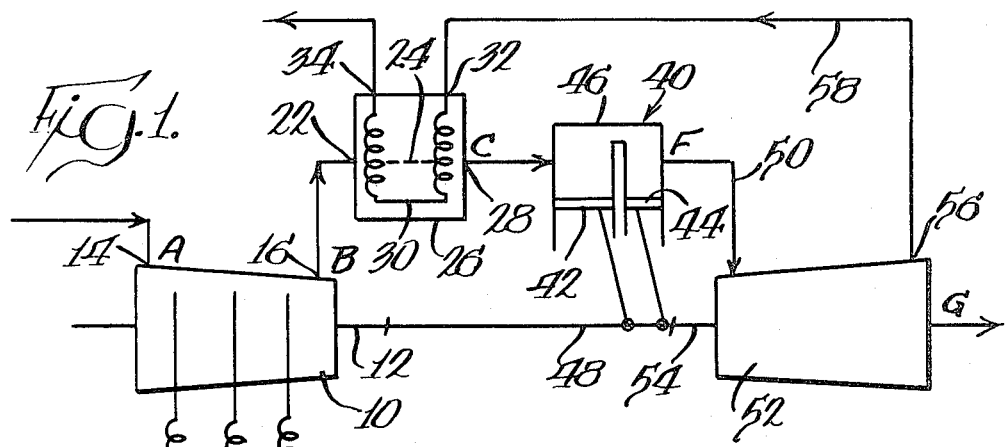
FIG. 1 is a diagrammatic illustration of an embodiment of the apparatus of the present invention.

An exemplary embodiment of an apparatus made according to the invention is illustrated in FIG. 1 and is seen to include a compressor 10 having a mechanical motion input in the form of a rotary shaft shown schematically at 12. The compressor 10 includes an inlet 14 for receiving the working fluid, specifically air, at substantially ambient temperature and pressure conditions. The compressor 10 also includes an outlet 16 whereat compressed working fluid at elevated pressure but substantially at ambient temperature exits the compressor 10.

In order that the compressed working fluid be substantially at ambient temperature, it will be appreciated that the compressor 10 must be of the sort that provides for isothermal compression. Thus, the compressor 10 must have high heat rejection and to this end, the same is provided with interstage cooling means shown schematically at 20 to provide for a compression exponent below 1.4.

Compressed working fluid exiting the outlet 16 of the compressor 10 is directed to an inlet 22 for a first flow path 24 through a recuperator or heat exchanger 26. The first flow path 24 includes an outlet 28. The heat exchanger 26 also includes a second flow path 30 which is in heat exchange relation with the flow path 24. The second flow path 30 has an inlet 32 and an outlet 34. As will be seen, the heat exchanger 26 extracts heat from the spent working fluid before it is discharged from the outlet 34 to atmosphere and heats the incoming compressed working fluid from the compressor 10.

The heated incoming working fluid leaving the heat exchanger 26 through the outlet 28 for the first flow path 24 is conveyed to a positive displacement compressor, combustor, expander, generally designated 40. The positive displacement mechanism 40 further compresses the incoming working fluid, adds heat thereto under substantially constant volume conditions by the burning of fuel therein and then partially expands the working fluid. Preferably, the positive displacement device 40 is of the type having a higher expansion ratio than compression ratio. There are several known mechanisms capable of accomplishing such results, one being that disclosed in German Auslegeschrift No. 23 24 088, evidently corresponding to U.S. patent application Ser. No. 252,840 filed May 12, 1972 by John Henry Brems, the details of which are herein incorporated by reference. As more fully disclosed therein, there is provided an internal combustion engine having a main piston 42 and an auxiliary piston 44 connected to an auxiliary crank shaft not shown. The auxiliary piston 44 sweeps a smaller volume than does the main piston 42 and both open to a common cylinder head 46. The auxiliary crank shaft, not shown, is mechanically coupled to the main crank shaft 48 to be driven at some multiple of the speed of the main crank shaft 48 which, according to the present application, would be one half the speed of the main crank shaft. As a consequence, the compression ratio of the mechanism 40 will be less than its expansion ratio.

Partially expanded working fluid exiting the mechanism 40 is directed via a suitable conduit 50 to the inlet of a turbine 52. In order to avoid blow down losses and yet avoid excessive back pressure, the interconnection between the positive displacement mechanism 40 and the compressor 52 is preferably provided with means whereby the inlet pressure of the turbine 52 is maintained at a value equal to the pressure of the working fluid as it is discharged from the mechanism 40. This may be accomplished, for example, by utilizing variable nozzles in the turbine 52 which are suitably controlled as, for example, in the manner disclosed in the commonly assigned co-pending U.S. patent application Ser. No. 941,485 filed Sept. 11, 1978 in the name of Alexander Goloff and entitled "Method and Apparatus Avoiding Blow Down Losses in Compound Engines."

The turbine 52 has a mechanical motion output in the form of a rotary shaft 54 which is suitably mechanically coupled to the main shaft 48 of the mechanism 40. One or both of the shafts 48 and 54 may be coupled to the shaft 12 of the compressor 10 to drive the same.

The working fluid partially expanded in the mechanism 40 is further expanded in the turbine 52 to substantially ambient pressure. The turbine of course converts the energy of such expansion to mechanical motion of its shaft 54.

Fully expanded working fluid exits the turbine 52 via an outlet 56 and is conveyed via a conduit 58 to the inlet 32 for the second flow path 30 of the heat exchanger 26. While the working fluid has been fully expanded at this point in time, it will nontheless have a temperature substantially elevated above ambient temperature. The energy represented by this heat content of the expanded working fluid is applied to the incoming, compressed working fluid flowing through the first flow path 24 as mentioned previously before fully expanded working fluid is discharged to atmosphere through the outlet 34 of the heat exchanger 26.

As nearly as possible, the compression of the working fluid occurring in the mechanism 40 is isentropic, that is, reversible without heat addition or rejection. Similarly, the expansion occurring in the mechanism 40 as well as the turbine 52 is as nearly isentropic as possible.

Heat addition in the mechanism 40 by the burning of fuel therein is at constant volume conditions, that is, at or about maximum compression as in conventional Otto cycle mechanisms.

As mentioned, it is preferred that the mechanism 40 be of the type having a higher expansion ratio than compression ratio. This permits the generation of higher temperatures in the cycle than might otherwise be permitted. For example, given state of the art construction of the turbine 52, there will be a definite temperature limitation at which the turbine 52 may receive hot, partially expanded working fluid. If that temperature is exceeded, the turbine blades will tend to grow due to thermal and centrifugal forces to the point where interference will occur resulting in damage or destruction of the turbine 52.

Therefore, by utilizing a positive displacement mechanism such as the mechanism 40 wherein the compression ratio is less than the expansion ratio, the maximum system temperature can be increased considerably since a greater portion of the expansion can take place in the positive displacement mechanism 40 than would otherwise be the case.

Figure 2:
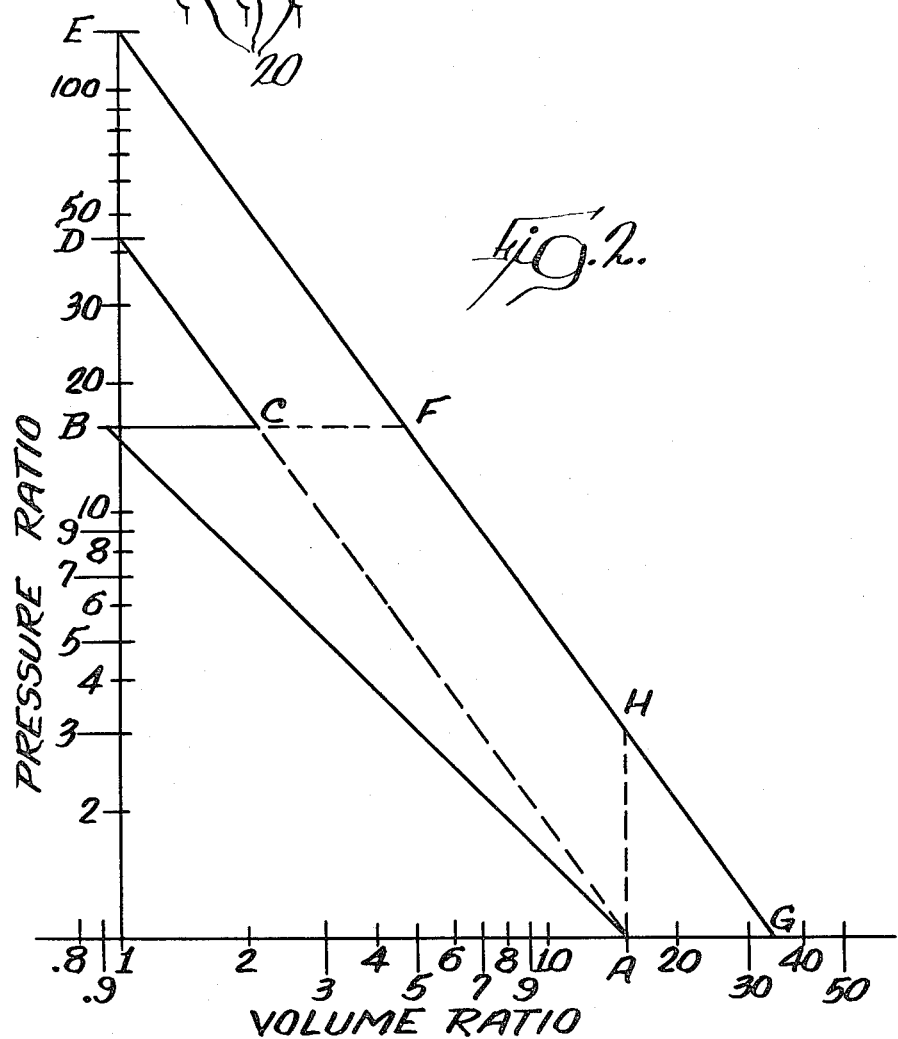
FIG. 2 illustrates a log-log plot of pressure ratios versus volume ratios of the working fluid at various stages in an embodiment of a method according to the invention and additionally illustrates corresponding points in a conventional method of operating a positive displacement mechanism according to the well known Otto cycle.

Referring to FIG. 2, the method of operation will now be described. At point A, ambient air at ambient temperature is taken into the compressor 10 and isothermally compressed until point B is reached. Compressed working fluid, still substantially at ambient temperature, is then directed to the heat exchanger 26 to receive heat therein. This heat addition is at substantially constant pressure conditions and is represented by the line B-C in FIG. 2.

The now heated, compressed working fluid is then directed to the mechanism 40 where it is isentropically compressed as represented by the line C-D. When isentropic compression has been completed, further heat addition is made in the mechanism 40. This is accomplished by the burning of fuel therein at or about maximum compression and therefore, the further heat addition will be at substantially constant volume conditions as represented by the line D-E in FIG. 2.

Initial expansion of the working fluid will then occur in the mechanism 40 and will be substantially isentropic. This portion of the expansion is illustrated by the line E-F in FIG. 2.

The partially expanded working fluid is then directed to the turbine 52, all the while avoiding blow down losses, for further isentropic expansion as represented by the line F-G in FIG. 2. The secondary stage of expansion occurring in the turbine 52 is down to ambient pressure conditions represented by point G. The fully expanded gas, still at a temperature above ambient, is then directed to the heat exchanger 26 to be cooled therein while heating the incoming working fluid. This process is represented by the line G-A in FIG. 2.

A similar, conventional Otto cycle is also illustrated in FIG. 2, in part in dotted line where the lines do not coincide with the lines previously mentioned. Compression occurs over the line A-C-D with heat addition occurring at the line D-E. Harnessed expansion occurs over the line E-F-H with the cycle being completed as shown by the line H-A. Thus it can be seen that the cycle of the present invention achieves greater efficiency for the same amount of fuel as represented by the areas of the triangles A-G-H and A-B-C. This in turn represents a theoretical cycle efficiency of the mechanism shown in FIG. 1 of 20–25% higher than an ideal Otto cycle engine. Representative pressure-volume-temperature relationships for the various points identified in the preceding discussion are set forth in the following table.

TABLE OF PRESSURE-VOLUME-TEMPERATURE RELATIONSHIPS

| Pt. In FIG. 2 | Press. Ratio | Abs. Press. | Vol. | Temp. deg. F. | Temp deg. R |
|---|---|---|---|---|---|
| A | 1 | 14.7 | 15 | 80 | 540 |
| B | 15.8 | 232 | 0.95 | 80 | 540 |
| C | 15.8 | 232 | 2.09 | 729 | 1189 |
| D | 44 | 647 | 1 | 1124 | 1584 |
| E | 132 | 1940 | 1 | 4292 | 4752 |
| F | 15.8 | 232 | 4.5 | 2100 | 2560 |
| G | 1 | 14.7 | 33 | 729 | 1189 |
| H | 3 | 44.1 | 15 | 1160 | 1620 |

INDUSTRIAL APPLICABILITY

From the foregoing, it will be appreciated that an apparatus made according to the invention as well as the method of performing work also made according to the invention have considerable applicability in any instance wherein substantial fuel conservation is required. The power plant is ideally suited for use in stationary applications as well as in large vehicles such as large trucks, construction vehicles, and the like.

It will likewise be recognized that a substantial increase in efficiency can be achieved through use of the invention without what might be termed a "technological breakthrough." Specifically, each of the components is well known so that all of the thermodynamic processes can be carried out with straight forward practical machinery. The cycle has the highest efficiency amongst known cycles wherein heat is not added at constant temperature. However, constant temperature cycles are extremely difficult in practice since the addition of heat isothermally is quite difficult.

It should be understood that the invention is not to be limited to isothermal or isentropic compression where so specified, and to isentropic expansion and heat addition at constant pressure or at constant volume when so specified. Rather, these thermodynamic processes are to be considered in the practical sense simply for the reason that what is theoretically obtainable and desirable in accordance with the teachings of the invention can only be approximated in actual practice.

Other aspects, objects and advantages of this invention can be obtained from a study of the drawings, the disclosures and the appended claims.

I claim:

1. A method of performing work utilizing the energy of an expanding working fluid comprising the steps of:
   (a) substantially isothermally compressing a working fluid from an initial pressure to a predetermined degree;
   (b) thereafter adding heat to the working fluid under substantially constant pressure conditions;
   (c) thereafter substantially isentropically compressing the working fluid a further amount;
   (d) thereafter adding additional heat to the working fluid under substantially constant volume conditions;
   (e) thereafter substantially isentropically expanding the working fluid to substantially said initial pressure while extracting work therefrom;
   (f) thereafter extracting hear from the working fluid; and
   (g) steps (c), (d) and at least the initial portion of step (e) being performed in a positive displacement mechanism having a higher expansion ratio than compression ratio.

2. The method of claim 1 wherein said steps are cyclically repeated in sequence and the heat extracted during the performance of step (f) is utilized in the addition of heat during the performance of step (b).

3. The method of claim 2 wherein the additional heat added during the performance of step (d) is obtained by the burning of fuel.

4. A method of performing work utilizing the energy of an expanding working fluid comprising the steps of:
   (a) substantially isothermally compressing a working fluid from an initial pressure to a predetermined degree;
   (b) thereafter adding heat to the working fluid under substantially constant pressure conditions;
   (c) thereafter substantially isentropically compressing the working fluid a further amount;

(d) thereafter adding additional heat to the working fluid under substantially constant volume conditions;
(e) thereafter substantially isentropically expanding the working fluid to substantially said initial pressure while extracting work therefrom;
(f) thereafter extracting heat from the working fluid;
(g) steps (c), (d), and the initial portion of step (e) being performed in a positive displacement mechanism having a higher expansion ratio than compression ratio, the completion of step (e) being performed in a turbine;
(h) whereby cycle efficiency may be maximized by generating relatively high fluid temperatures during step (d) and reducing the temperature of the fluid in said positive displacement mechanism during said initial portion of step (e) sufficiently to allow the completion of step (e) in said turbine without causing damage to said turbine.

* * * * *